United States Patent

Garcia et al.

[11] Patent Number: 6,122,528
[45] Date of Patent: Sep. 19, 2000

[54] COMBINATION RADIO CARRY CASE AND PROGRAMMER

[75] Inventors: Jorge L. Garcia, Plantation; Charles B. Swope, Coral Springs; Juan B. de la Luz, Miami, all of Fla.

[73] Assignee: Motorola, Inc., Schaumburg, Ill.

[21] Appl. No.: 09/122,604

[22] Filed: Jul. 27, 1998

[51] Int. Cl.[7] .............................. H04Q 7/20; H04B 1/38
[52] U.S. Cl. .................. 455/558; 455/575; 455/557; 455/89; 455/90
[58] Field of Search ..................................... 455/557, 575, 455/558, 89, 90, 351; 340/825.22; 320/106

[56] References Cited

U.S. PATENT DOCUMENTS

| | | | |
|---|---|---|---|
| 5,488,356 | 1/1996 | Martinovich et al. | 340/825.44 |
| 5,542,105 | 7/1996 | Finch et al. | 455/575 |
| 5,689,825 | 11/1997 | Averbuch et al. | 340/825.22 |
| 5,963,012 | 10/1999 | Garcia et al. | 320/106 |

*Primary Examiner*—Daniel S. Hunter
*Assistant Examiner*—Alan T. Gantt
*Attorney, Agent, or Firm*—Barbara R. Doutre

[57] ABSTRACT

A carry case (104) for a portable radio (102) provides automatic programming of the radio by including a proximity sensor (106) in the carry case. The proximity sensor (106) includes embedded radio programming information which gets downloaded to the radio (102) when the radio is inserted into the carry case (104). The radio (102) includes an excitation circuit (114) for activating the proximity sensor (106) when the radio (102) is inserted within the carry case (104). The radio (102) also includes a reader circuit (116) for reading the radio programming information. Individualized programming parameters can be included within a user's carry case (104) so that a radio (102) can be shared amongst multiple users yet still provide personalized features.

9 Claims, 2 Drawing Sheets

COMBINATION RADIO CARRY CASE AND PROGRAMMER

TECHNICAL FIELD

This invention relates to carry cases for communications products, and more specifically to electronic carry cases.

BACKGROUND

Programmable radios, such as two-way radios, are often programmed with customized settings for individual users. However, when multiple users are required to share radios, for example between shifts in a manufacturing facility or public safety department, the ability to customize each radio becomes more limited. Desired radio parameters such as talk zones, volume settings, and caller IDs may vary from individual to individual, and often require a service technician to reprogram the radio which is simply too inconvenient, impractical, and costly when dealing with shared radios. Thus, radio users may find themselves left with generically programmed radios that do not meet all of their needs.

Hence, it would be beneficial to have the capability of automatically reprogramming a radio when the radio changes hands between users.

DETAILED DESCRIPTION OF THE PREFERRED EMBODIMENT

Figure 1:
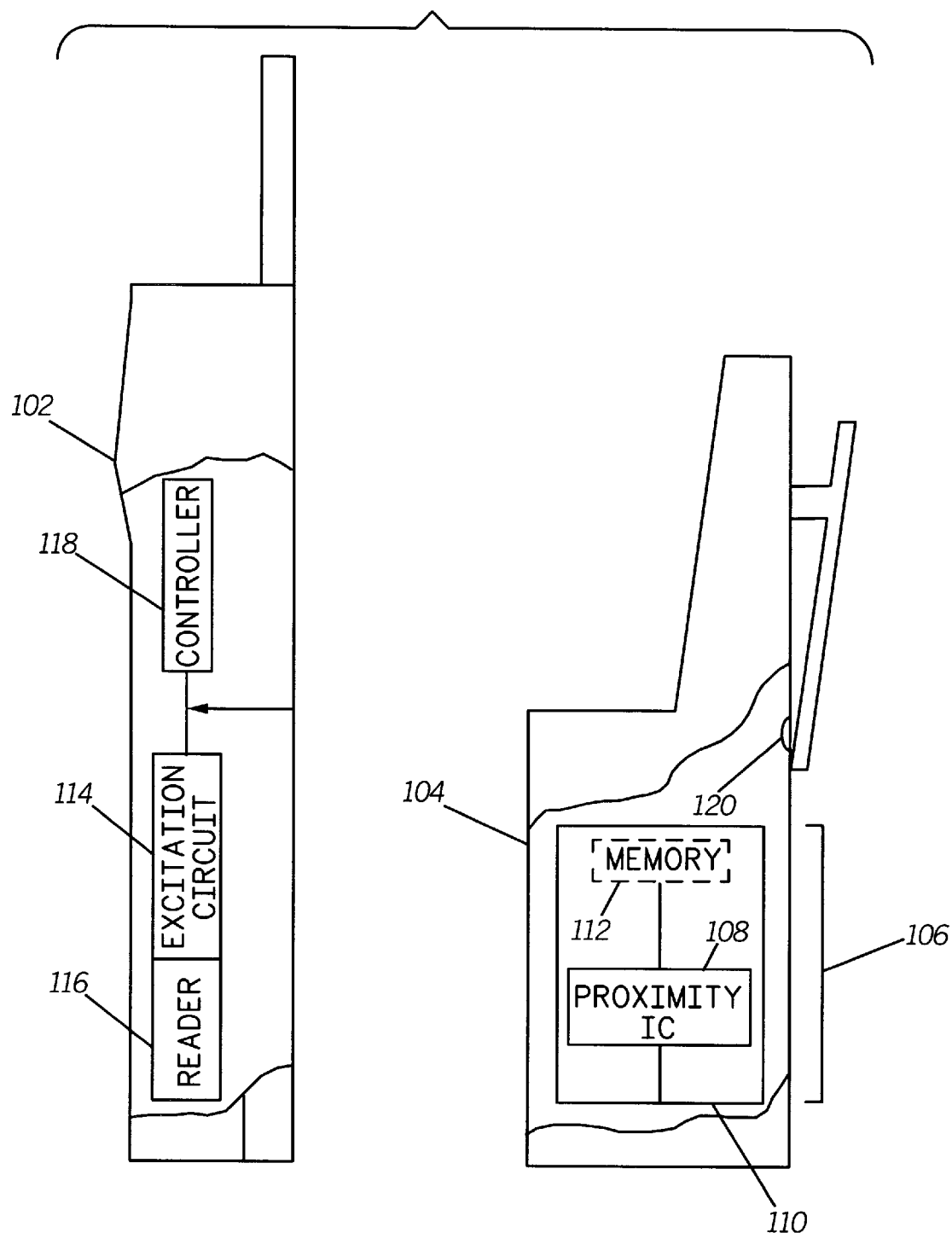
FIG. 1 a block diagram of a radio programming system in accordance with the present invention.

While the specification concludes with claims defining the features of the invention that are regarded as novel, it is believed that the invention will be better understood from a consideration of the following description in conjunction with the drawing figures, in which like reference numerals are carried forward.

Communication devices, such as portable radios, are often used in conjunction with carry cases to provide hands-free carrying capability. The invention to be described herein provides the advantages of automatic programming in a contactless configuration by incorporating smart card technology capability within a carry case and radio.

Referring now to FIG. 1, there is shown a portable radio programming system 100 in accordance with the present invention. Programming system 100 includes a portable programmable radio 102 and a carry case 104 for automatically programming the radio 102. This programming takes place when the radio 102 comes within a predetermined distance of the carry case 104, such as when the radio is inserted within the carry case. In accordance with the present invention, a proximity sensor 106, preferably formed of a proximity integrated circuit (IC) 108 and antenna coil 110 known in the art, is coupled to the carry case 104. The proximity sensor 106 may be permanently embedded within the carry case 104, or alternatively, the proximity sensor may be inserted into a pocket of the carry case. The proximity sensor 106 includes stored radio programming information, or alternatively, the programming information can be stored in a memory device 112 coupled to the proximity IC 108. In accordance with the present invention, radio 102 includes an excitation circuit 114 for activating the proximity sensor 106 when the radio 102 comes within a predetermined distance of the carry case 104. In accordance with the present invention, the radio 102 further includes a reader circuit 116 for reading the radio programming information in response to the excitation circuit 114 being activated. A controller 118 within the radio 102 then programs the radio 102 with the programming information read by the reader 116.

The proximity sensor 106 is also commonly referred to as a vicinity card and excitation circuit 114 and reader 116 are commonly referred to as a vicinity coupling device. As known in the art, vicinity cards are cards into which integrated circuit(s) and an antenna have been placed and in which communication to such integrated circuit(s) is done by inductive coupling. The vicinity coupling device includes the reader/writer device and uses inductive coupling to provide power to the vicinity card and also to control the data exchange with the vicinity card.

Basically, the programming system 100 of the present invention allows the radio 102 to be programmed when the carry cases' proximity sensor 106 is proximally coupled to the radio's excitation circuit 114 and reader 116. Once the proximity sensor 106, excitation circuit 114, and reader 116 are proximally coupled, inductive coupling 120 is established, and the radio programming information is downloaded from the carry case 104 to the radio 102. The radio is then programmed with the programming information by controller 118.

Figure 2:
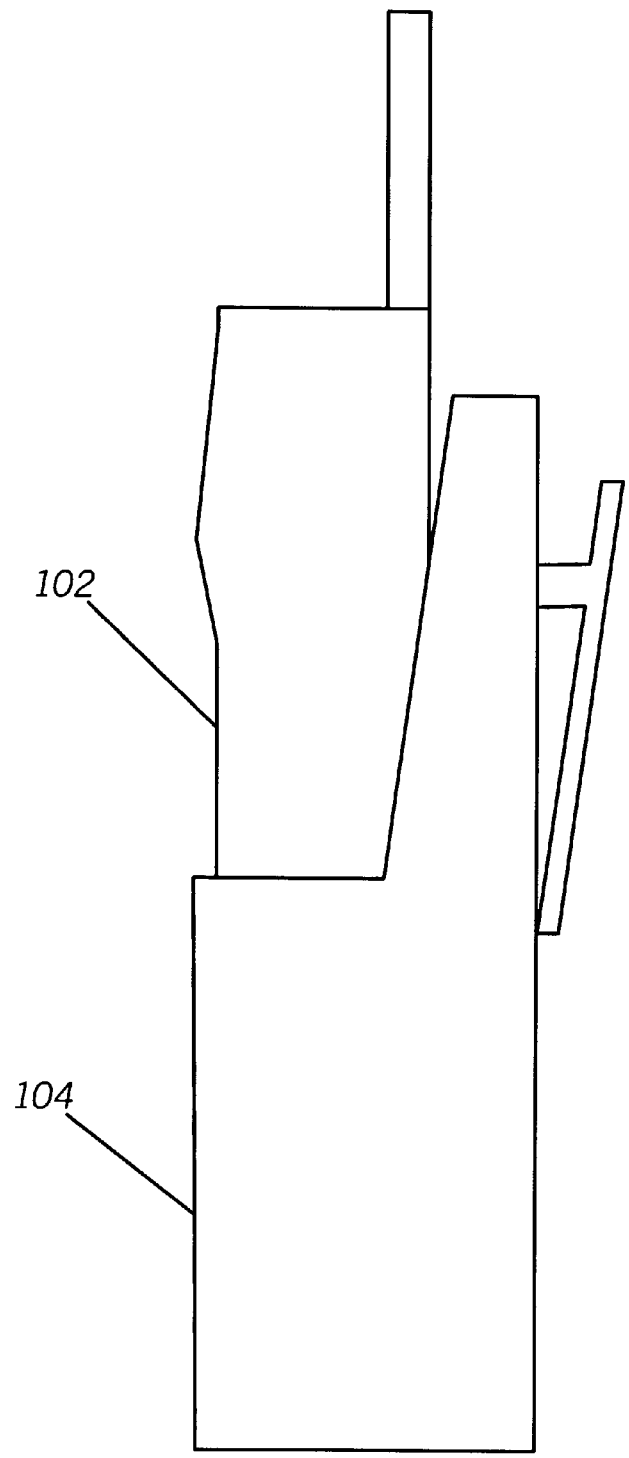
FIG. 2 is the radio of FIG. 1 inserted with the carry case in accordance with the present invention.

The programming system 100 of the present invention is preferably configured such that the programming of the radio 102 occurs when the radio is inserted within the carry case 104 as shown in FIG. 2. The carry case preferably includes a switching device 120, such as a mechanical or magnetic switch, for automatically turning on the radio circuitry when the radio is initially inserted into the carry case. This facilitates the automatic programming process by eliminating the need of having the reader circuitry 116 on all the time. Once the radio 102 is inserted within the carry case 104, a wireless link is established between the proximally coupled excitation circuit 114, proximity sensor 106, and reader 116. Magnetic flux signals are transmitted from the radio 102 to the carry case 104 to excite the proximity sensor 106, and magnetic flux signals containing the programming information are transmitted from the carry case 104 to be received by the radio's reader 116. Once programmed, the radio controller 118 can shut down the reader 116 if desired.

The programming system 100 of the present invention includes at least one carry case 104 having the proximity sensor 106 and stored radio programming information, and at least one radio 102 having a reader 116 and excitation circuit 114. A plurality of carry cases having individualized radio programming information stored therein can now be used to provide customized programming for the at least one radio. Thus, one radio can be shared amongst a plurality of users yet still provide customized automatic programming when the radio 102 is inserted into a different carry case.

The advantage to embedding the proximity sensor 106 within the carry case is that the user is given the capability of reprogramming the radio unconsciously by simply inserting the radio into the case. Once programmed, the radio retains the programmed parameter information until re-inserted into a different carry case having different programming information. Alternatively, the proximity sensor 106 can be insertable/removable from the carry case, say from a pocket on the side, so that even a single carry case can be shared amongst a plurality of users having individual proximity sensors. The programming system 100 of the present invention also provides the advantage of being contactless which minimizes alignment problems and cost.

Accordingly, there has been provided a carry case which automatically programs a radio when the radio is inserted into, or comes within a predetermined distance of, the carry case. By including a proximity sensor 106 in the carry case 104, and by including an excitation circuit 114 and reader 116 in the radio 102, radio programming information can be downloaded to the radio 102 when the excitation circuit 114 is activated. Individualized programming parameters can be embedded or inserted within a user's carry case 104 so that a radio 102 can be shared amongst multiple users yet still provide personalized features.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A carry case for a programmable radio, comprising:
    at the carry case:
        a proximity sensor embedded within the carry case, the proximity sensor having radio parameter information stored therein;
    at the programmable radio:
        an excitation circuit for activating the proximity sensor; and
        a reader circuit for receiving the radio parameter information in response to the excitation circuit being activated, the programmable radio being programmed in response to the received radio parameter information.

2. The carry case of claim 1, wherein the proximity sensor is removable from the carry case.

3. A portable radio programming system, including:
    at least one carry case having a proximity sensor with stored radio programming information; and
    at least one radio, including:
        an exciter circuit for activating the proximity sensor when the radio comes within a predetermined distance of the carry case;
        a reader circuit for reading the radio programming information once the proximity circuit is activated; and
        a controller for programming the radio in response to the radio programming information.

4. The radio programming system of claim 3, further including a plurality of carry cases having individualized radio programming information stored therein to provide customized programming for the at least one radio, the at least one radio being shared amongst a plurality of users.

5. The radio programming system of claim 3, wherein proximity sensor with stored radio programming information is embedded within the carry case.

6. The radio programming system of claim 3, wherein proximity sensor with stored radio programming information is removable from the carry case.

7. A programming system for a radio, comprising:
    a plurality of carry cases for receiving the radio, each carry case including a proximity sensor and stored radio programming information; and
    the radio including:
        an excitation circuit for activating the proximity sensor; and
        a reader for reading the stored programming information, the radio being programmed with the stored programming information.

8. The programming system of claim 7, wherein the portable radio is shared amongst a plurality of users.

9. The programming system of claim 7, wherein the plurality of carry cases each further include a switch for automatically turning on the radio's reader.

* * * * *